Patented June 20, 1939

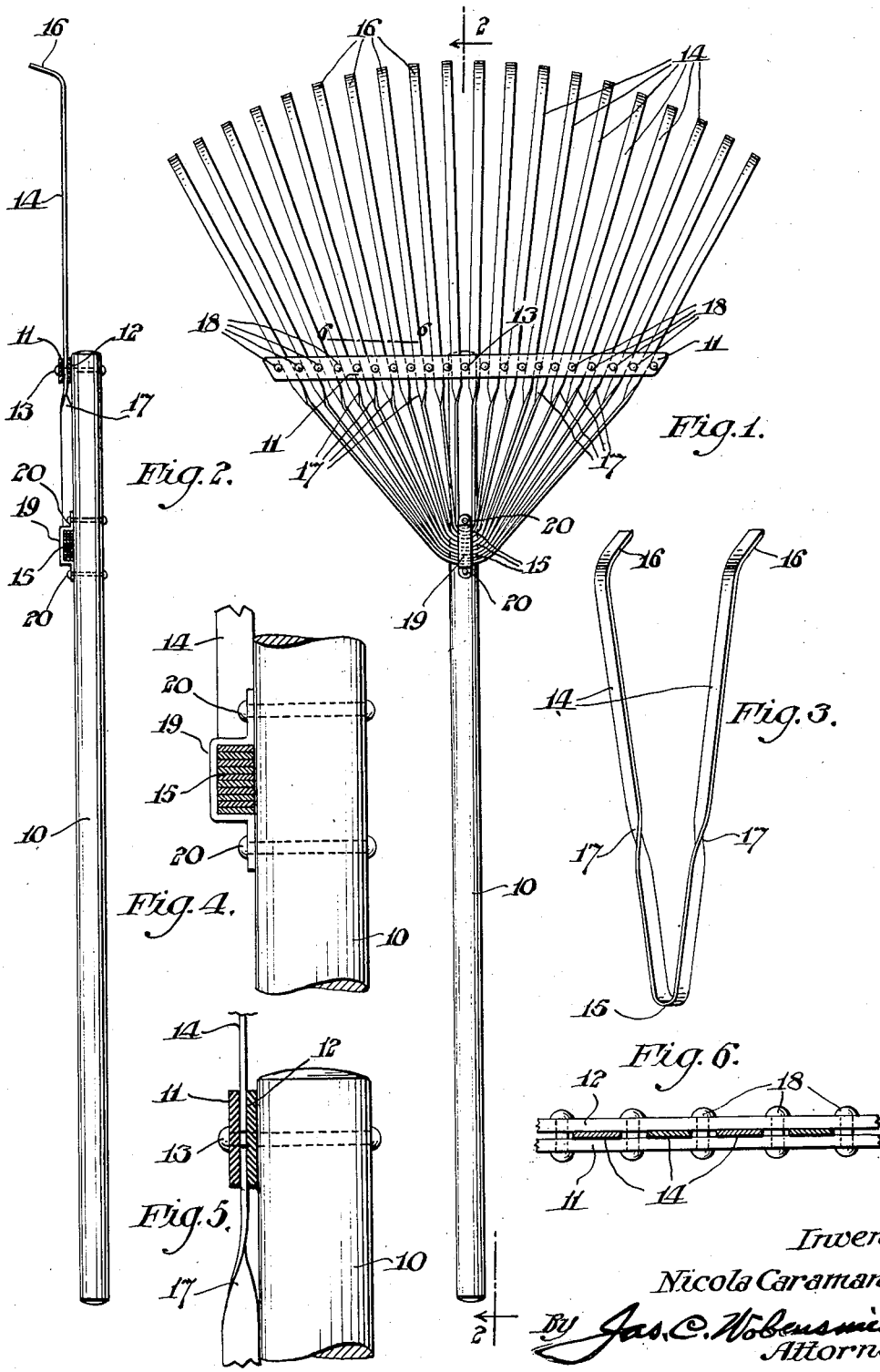

2,163,421

UNITED STATES PATENT OFFICE 2,163,421

GARDEN RAKE

Nicola Caramanico, Philadelphia, Pa.

Application May 17, 1938, Serial No. 208,361

5 Claims. (Cl. 55—10)

This invention relates to garden rakes, and it relates more particularly to a rake of the type in which the tines are made of thin flat spring metal, and which is intended to be used in a manner somewhat similar to that of a broom for the purpose of gathering up leaves, long grass, weeds, and other refuse on lawns, paths and other places.

The principal object of the present invention is to provide a garden rake of the aforesaid type which will be relatively light, yet strong and durable, and which may be inexpensively manufactured.

With the foregoing object in view, the invention contemplates the provision of a rake in which the spring metal tines are secured to the handle, and suitably braced and positioned with respect thereto, in a novel manner.

The nature and characteristic features of the invention will be more readily understood from the following description, taken in connection with the accompanying drawing forming part hereof, in which:

Figure 1 is an underneath plan view of a garden rake embodying the main features of the present invention;

Fig. 2 is a view of the rake partly in side elevation and partly in section taken approximately on the line 2—2 of Figure 1;

Fig. 3 is a perspective view illustrating a unitary pair of tines detached;

Figs. 4 and 5 are enlarged fragmentary views partly in elevation and partly in section illustrating certain details of construction; and Fig. 6 is an enlarged fragmentary detail view illustrating a section taken on the line 6—6 of Fig. 1.

Referring to the drawing, 10 is the handle of the rake, which handle may be of wood or metal tubing as preferred. A pair of suitably spaced transverse bars 11 and 12 are secured to one end of the handle by means of a rivet 13, or other suitable fastening device.

The tines 14 are made of thin flat spring metal and disposed in unitary pairs in a manner to be presently explained. The metallic strip of which each pair of tines is made is bent as at 15 to provide in each unit, as shown in detached perspective in Fig. 3, two arms which constitute the tines 14, the end of each arm or tine 14 being bent over at its end, as at 16, in the usual and customary manner. Each of the tines 14 is twisted at right angles, as at 17, a suitable distance from the bent portion 15, and adjacent the transverse bars 11 and 12 between which the tines 14 extend.

The transversely extending bars 11 and 12 are secured to each other by means of spaced rivets 18, and in the spaces thus provided between the rivets 18, the tines 14 extend. The tines 14 are not only held between said bars 11 and 12 but are also positioned in their proper diverging relationship by means of said rivets 18.

The tine members are bunched or nested together at their bent portions 15, and there is provided a saddle member 19 which extends over the nested bent portions 15 of the tine members, and which is secured by means of rivets 20 to the handle 10.

By the foregoing arrangement, there is provided a garden rake, the parts of which may be quickly and inexpensively made and assembled, and which is so constructed and arranged as to provide a relatively light, yet strong and durable, structure.

I claim:

1. In a garden rake comprising a handle and a plurality of flat metal strips forming divergingly extending tines, said tines being disposed in unitary pairs, the tines of each pair being joined to each other by an integral bent portion, the bent portions of the pairs of tines being nested, means for securing the nested bent portions of the tine members to the handle, a pair of transversely extending bars secured to the handle and having the tines extending therebetween, and a plurality of spaced rivets extending through said bars between said tines serving to maintain the tines in spaced divergent positions.

2. In a garden rake comprising a handle and a plurality of flat metal strips forming divergingly extending tines, said tines being disposed in unitary pairs, the tines of each pair being joined to each other by an integral bent portion, the bent portions of the pairs of tines being nested, a saddle member extending over the nested bent portions of the tine members and secured to the handle, a pair of transversely extending bars secured to the handle and having the tines extending therebetween, and a plurality of spaced rivets extending through said bars serving to maintain the tines in spaced divergent positions.

3. In a garden rake comprising a handle and a plurality of flat metal strips forming divergingly extending tines, said tines being disposed in unitary pairs, the tines of each pair being joined to each other by an integral bent portion, the bent portions of the pairs of tines being nested, a saddle member extending over the nested bent portions of the tine members and secured to the handle, a pair of transversely extending bars secured to the handle and having the tines extending therebetween, each of the tines being twisted at right angles adjacent said bars, and a plurality of spaced rivets extending through said bars serving to maintain the tines in spaced divergent positions.

4. In a garden rake comprising a handle and a plurality of flat imperforate metal strips forming divergingly extending tines, means for securing said tines to the handle at points remote from the free ends of said tines, a pair of transversely extending bars having the tines extending therebetween, and a plurality of spaced rivets extending through said bars and between said tines serving to maintain the tines in spaced divergent positions.

5. In a garden rake comprising a handle and a plurality of flat imperforate metal strips forming divergingly extending tines, means for securing said tines to the handle at points remote from the free ends of said tines, a pair of transversely extending bars secured to the handle and having the tines extending therebetween, each of said tines being twisted at right angles adjacent said bars, and a plurality of spaced rivets extending through said bars and between said tines serving to maintain the tines in spaced divergent positions.

NICOLA CARAMANICO.